United States Patent [19]

Salowe et al.

[11] Patent Number: 4,623,949
[45] Date of Patent: Nov. 18, 1986

[54] BUS DIFFERENTIAL RELAY

[75] Inventors: Seymour Salowe, Murrysville Boro; Robert T. Elms, Monroeville Boro; Richard A. Johnson, Murrysville Boro, all of Pa.

[73] Assignee: Westinghouse Electric Corp., Pittsburgh, Pa.

[21] Appl. No.: 773,473

[22] Filed: Sep. 6, 1985

[51] Int. Cl.⁴ .............................................. H02H 7/26
[52] U.S. Cl. ....................................... 361/63; 361/87; 361/97
[58] Field of Search ....................... 361/62, 63, 87, 96, 361/97

[56] References Cited

U.S. PATENT DOCUMENTS

| | | | |
|---|---|---|---|
| 3,590,326 | 6/1971 | Watson | 361/96 |
| 3,633,071 | 1/1972 | Fendt et al. | 361/63 |
| 3,970,899 | 2/1975 | Davis | 361/96 |
| 4,149,210 | 4/1979 | Wilson | 361/96 |
| 4,237,512 | 12/1980 | Forford | 361/63 |
| 4,502,086 | 2/1985 | Ebisaka | 361/87 |

Primary Examiner—A. D. Pellinen
Assistant Examiner—A. Jonathan Wysocki
Attorney, Agent, or Firm—W. E. Zitelli

[57] ABSTRACT

A bus differential relay which is capable of distinguishing between an internal bus fault and an external fault on a feeder line with saturation of the faulted feeder line current transformer during portions of the alternating current cycles thereof is disclosed. The relay generates a net current signal or differential signal from the signals generated by the feeder line current transformers of the protected bus section. During an internal fault, the current differential signal extends in amplitude beyond fault current limits and a trip signal is generated to interrupt current to the bus section. During an external fault with current transformer saturation, the current differential signal will include amplitude portions of the alternating current cycles which exceed the fault limits. However, the current differential signal will also include portions of its waveform which are zero or near zero in amplitude (flat spots) which portions reflect that the current transformer of the faulted feeder line is operating out of saturation. If these flat spots occur for a sustained duration of time, for each half cycle the trip signal generation by the relay is inhibited.

7 Claims, 9 Drawing Figures

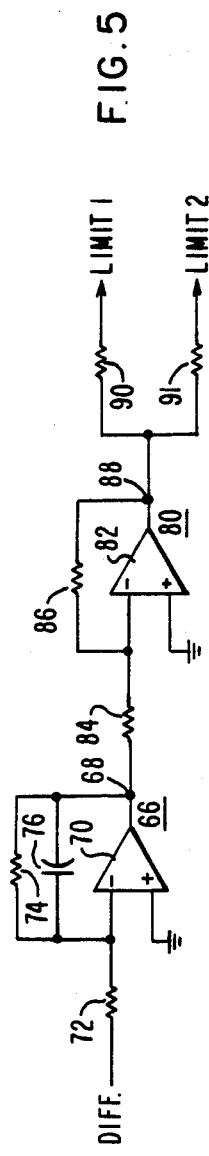
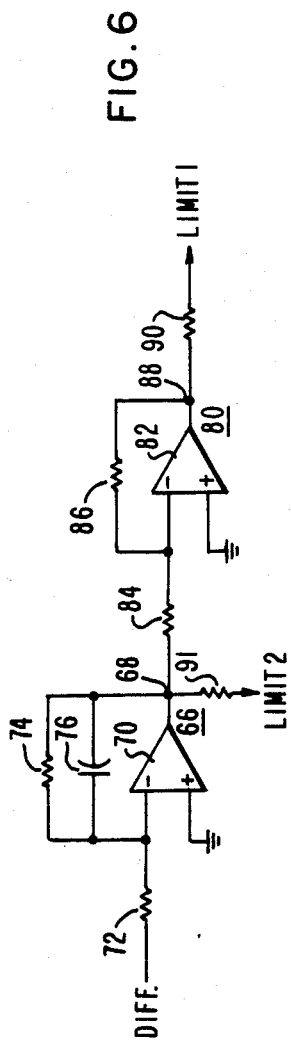
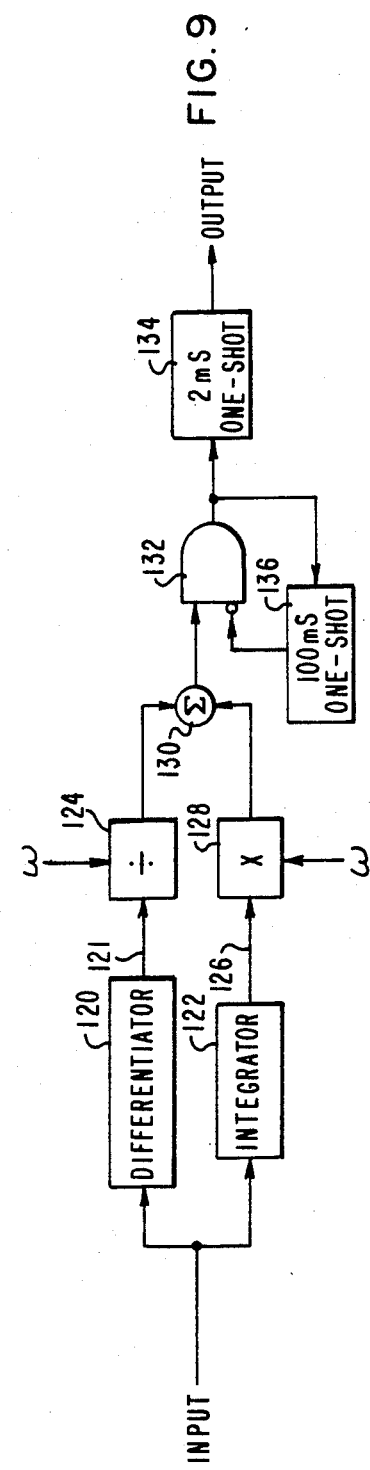

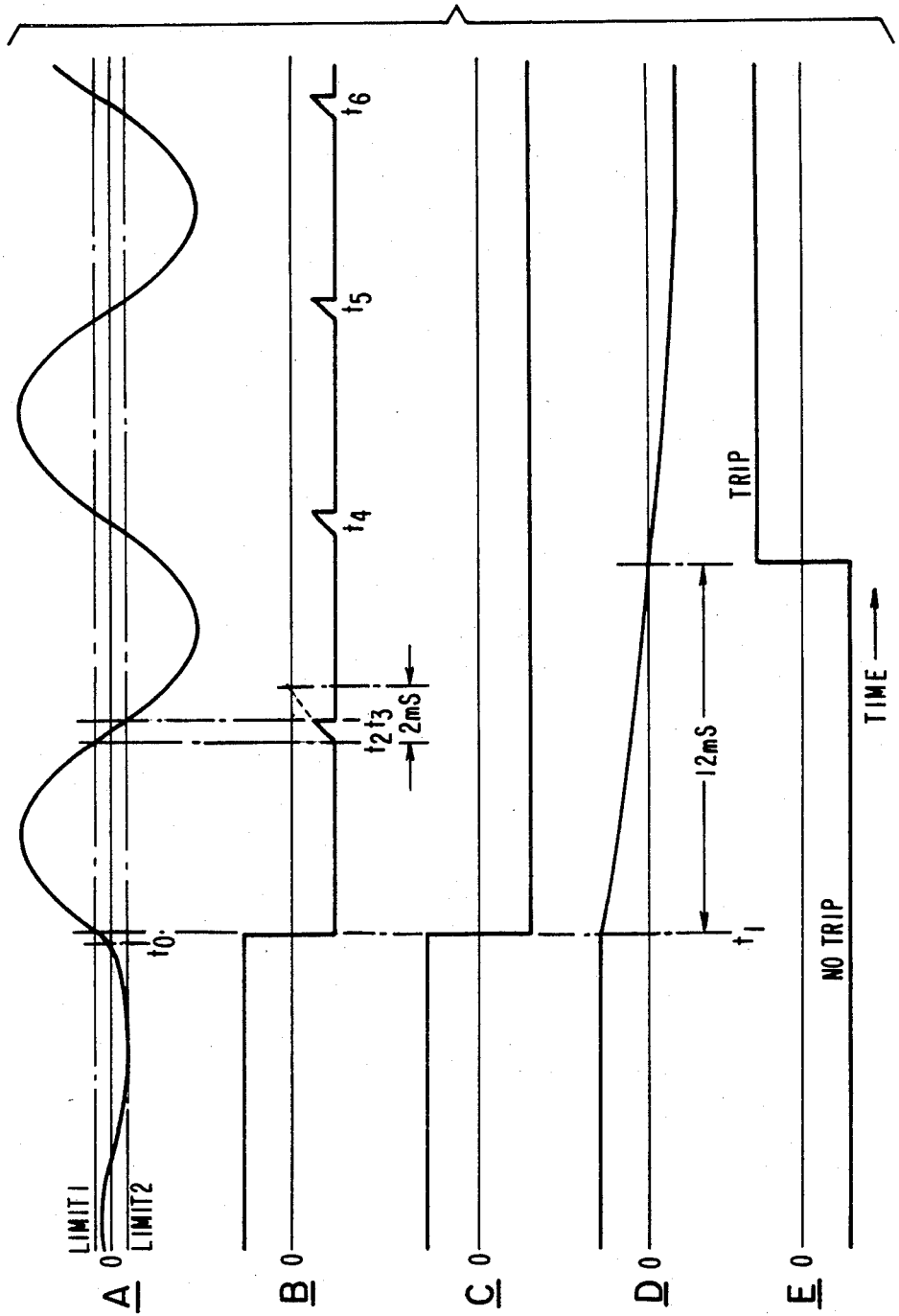

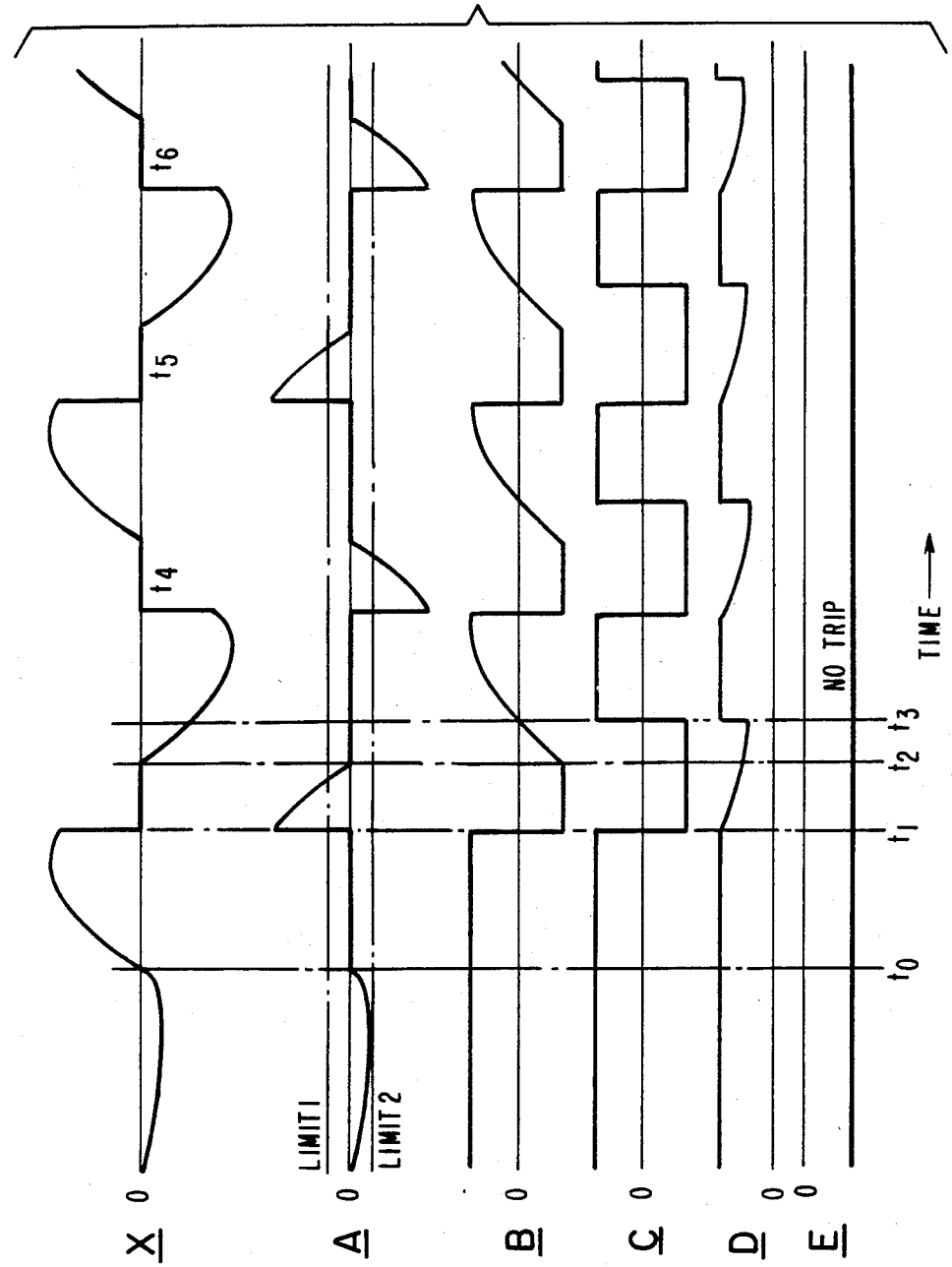

BUS DIFFERENTIAL RELAY

BACKGROUND OF THE INVENTION

The present invention relates to bus section protection in a power system network, and more particularly, to a bus differential relay which is governed by current transformer generated current signals of a plurality of feeder lines coupled to the bus section to protect the bus section from an internal fault by interrupting current through the plurality of feeder lines and to safeguard against current interruption from a false indication of an internal fault caused by an external fault on at least one of the feeder lines of the plurality with the corresponding current transformer being saturated during a portion of the periods of the alternating current thereof.

In a power system network, a bus section is used to conduct alternating current between a plurality of feeder lines coupled thereto. A schematic illustration of such an arrangement is depicted in FIG. 1 with the bus section denoted by the solid line 10 and the feeder lines denoted by the solid lines 11-16. Each feeder line 11-16 may include a current transformer 17-22, respectively, for measuring instantaneously the alternating current therethrough. Each current transformer generates a signal representative of the alternating current of its corresponding feeder line in both amplitude and periodicity, but has a limited current amplitude measurement capacity beyond which saturation thereof occurs which results in the loss of its generated signal. Each feeder line 11-16 may also include a conventional circuit breaker unit (depicted as rectangular blocks labeled CB) 23-28, respectively, for interrupting the current thereof when activated.

Typically, different bus protection is performed by comparing all of the current signals of the feeder lines that connect to the bus section. If all of the current signals from the current transformers 17-22, for example, sum to zero or near zero, i.e. no differential signal, the bus section 10 is considered balanced and without a fault on it. However, should the bus section 10 incur an internal fault such as that shown by the short circuit to ground potential at 30, the current sum is caused to be unbalanced resulting in a differential signal of sufficient amplitude to indicate that an internal fault exists.

An external fault on a feeder line such as that shown at 32 on feeder line 16 in FIG. 2 should ideally effect a zero or near zero differential current signal because the currents of the feeder lines 11-16 of the bus section 10 remain balanced. However, in practice, the current transformers of the feeder lines are limited in their current amplitude measurement capacity. Accordingly, saturation may occur on the faulted feeder line current transformer 22, for example, because it is carrying the combined short circuit currents of all of the other feeder lines connected to the bus section 10. This condition is exemplified by the illustrated waveforms A, B and C of FIG. 3.

Referring to FIG. 3, the waveform A represents a composite of the current signals of the feeder lines 11-15 while waveform B represents the current signal of the faulted feeder line 16. The zero or near zero portions 40 of the waveform B represent the portions of the current transformer measurement during which saturation occurs. Waveform C is the summation of the current waveforms A and B or the differential signal which is used to detect an internal fault. Corresponding to the times 40 during which current transformer saturation is occurring, the differential signal deviates from its zero or near zero amplitude value as shown by the waveforms at 42. If the amplitude deviations 42 are left uncompensated, they will result in a false indication of an internal fault rendering activation of the breaker units 23-28 and consequent interruption of current through the bus section 10.

Some relay manufacturers have proposed relay designs to overcome the aforementioned drawback with respect to the current transformer saturation during an external fault on a feeder line. An example of such a proposal is disclosed in the U.S. Pat. No. 4,502,086; entitled "Differential Protective Relay"; issued Feb. 26, 1985 to Toshinobu Ebisaka. The Ebisaka patent proposes using the outputs of the feeder line current transformers with diodes and a resistor network to provide three components to determine whether an internal or external fault exists. One component is the sum of currents delivered to the bus, another is the sum of currents exiting the bus, and the third is the sum of both of these currents or the net sum of currents through the bus section. The Ebisaka implementation appears somewhat overly complicated in its design using the philosophy or inhibiting the trip signal during no fault or external fault/saturated current transformer conditions and suppressing the inhibit signal during an actual internal fault condition.

The present invention overcomes the complications of the Ebisaka proposed relay and offers a much simpler embodiment to distinguish between actual internal fault conditions and external fault with current transformer saturation conditions.

SUMMARY OF THE INVENTION

A power system network includes a bus section and a plurality of feeder lines coupled thereto for conducting alternating current through the bus section. Each feeder line includes a current transformer for measuring the alternating current therethrough and generating a signal representative thereof in both amplitude and periodicity. Each current transformer has a limited current amplitude measurement capacity beyond which saturation thereof occurs. During saturation, the generated feeder line current signal is essentially lost.

In accordance with the present invention, a bus differential relay is governed by the generated current signals of the plurality of feeder lines to protect the bus section from an internal fault by interrupting current through the plurality of feeder lines. The relay additionally safeguards against current interruption from a false indication of an internal fault caused by an external fault on at least one of the feeder lines with the corresponding current transformer being saturated during a portion of the periods of the alternating current thereof. The bus differential relay includes a first circuit for summing instantaneously the generated current signals to generate a current differential signal which is provided to a window comparator circuit. The window comparator circuit generates a first indication upon the occurrence of the amplitude of the current differential signal extending outside a formed reference amplitude window and for generating a second indication upon the occurrence of the amplitude of the differential signal falling within said formed reference amplitude window. The generation of the first indication sets a first timing circuit to commence timing over a first time period. If permitted to time through the first time period, the first timing circuit generates a trip signal to render current interruption through the plurality of feeder lines. The generation of a second indication sets a second timing circuit to commence timing over a second time period. If permitted to time through the second time period, the second timing circuit generates a reset signal. The second timing circuit is resettable during the second timing period by the generation of a first indication to prevent the generation of the reset signal. The first timing circuit is resettable during the first timing period by the generation of a reset signal to prevent the generation of the trip signal. The first timing period is longer than the second timing period.

In accordance with another aspect of the present invention, a fourth circuit may be included in the bus differential relay for altering the amplitude levels of the formed reference amplitude window in accordance with a signal representative of the average of the current differential signal. In one embodiment, the amplitude levels are altered in the same direction by adding to each a common polarity signal which is commensurate with the average signal. In another embodiment, the amplitude levels are altered in opposite directions by adding to one level a positive polarity signal and to the other level a negative polarity signal, both of the positive and negative polarity signals being proportional to the average signal.

A further aspect of the present invention includes a change detector circuit coupled to each current transformer for detecting a potential fault inception from the current signals generated thereby. Upon such detection, the change detector generates a signal pulse which governs a fifth circuit to shorten the first timing period for the duration of the signal pulse, whereby a trip signal may be generated by the first timing circuit after timing through the shortened timing period.

BRIEF DESCRIPTION OF THE DRAWINGS

FIG. 5 is a schematic of a circuit for dynamically adjusting amplitude window reference levels suitable for use in the embodiment of FIG. 4.

FIG. 6 is a schematic of an alternate circuit for dynamically adjusting amplitude window reference levels suitable for use in the embodiment of FIG. 4.

FIG. 7 depicts time waveforms A through E which are used to describe the operation of the bus differential relay embodiment of FIG. 4 during an internal bus fault condition.

FIG. 8 depicts time waveforms A through E and X which are used to describe the operation of the bus differential relay embodiment of FIG. 4 during an external bus fault condition with feeder line current transformer saturation.

FIG. 9 is a block diagram schematic embodiment of a change detector suitable for use in the bus differential relay depicted in FIG. 4.

DESCRIPTION OF THE PREFERRED EMBODIMENT

Figure 1:
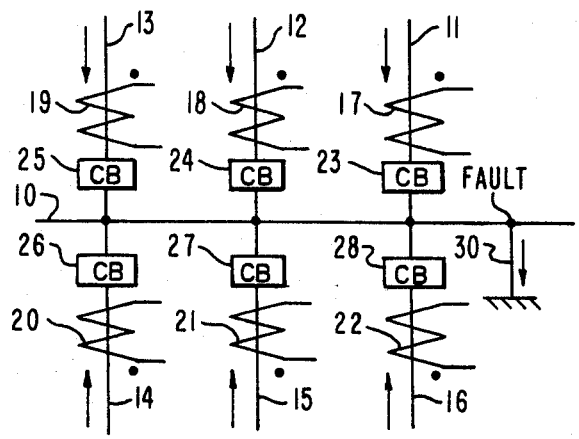
FIG. 1 is a schematic illustration of a bus section in a plurality of feeder lines coupled thereto with the bus section incurring an internal fault.
Figure 2:
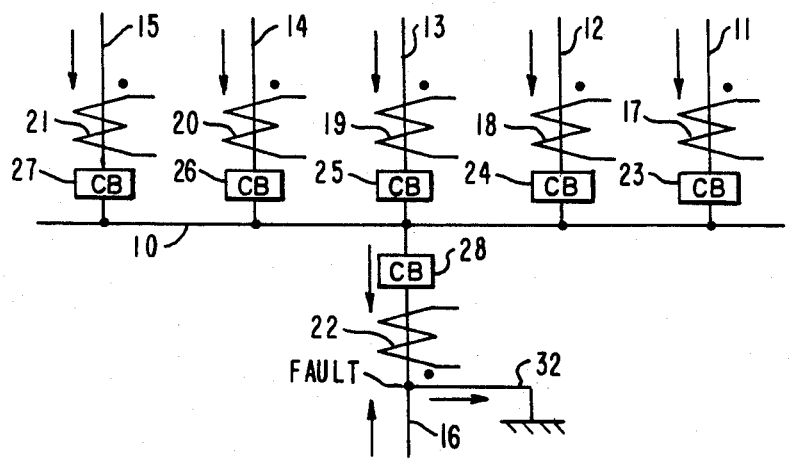
FIG. 2 is a schematic illustration of a bus section and a plurality of feeder lines with one of the feeder lines incurring an external fault.
Figure 3:
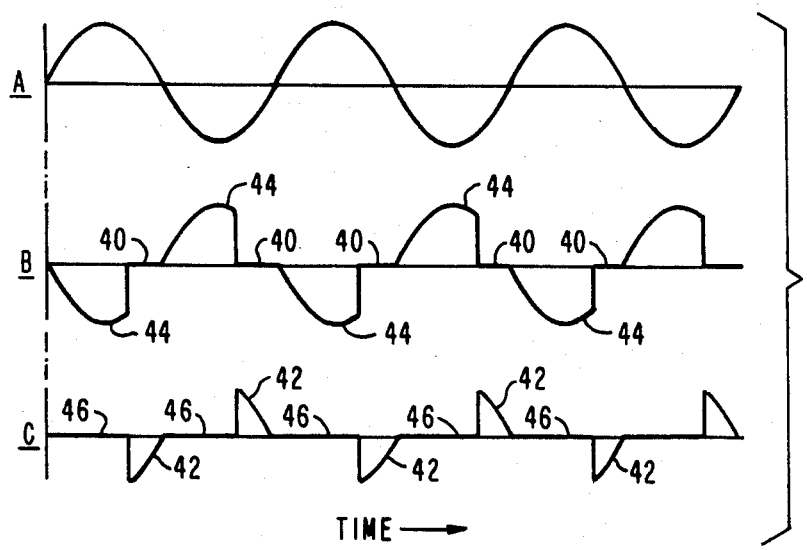
FIG. 3 includes waveforms A, B and C exemplifying current conditions during an external fault of a feeder line with the current transformer thereof being saturated during portions of the alternating current cycles.

The underlying principle for the present invention in distinguishing between internal faults and external faults with feeder line current transformer saturation is that there is a portion of every alternating current cycle where the faulted feeder line current transformer pulls out of saturation for at least a few milliseconds. This is depicted at the portions 44 in the exemplary waveform B of FIG. 3. The net resultant current waveform C of FIG. 3 reveals that the summation of all of the feeder line current signals is zero or near zero during the time intervals where the faulted feeder line transformer is out of saturation; refer to portions 46 in waveform C. Knowing that saturation occurs every half cycle of the faulted feeder line current waveform, the summation current waveform is expected to exhibit zero or near zero portions (flat spots) 46 which may have a minimum width of approximately two milliseconds each half cycle. Thus, a zero or near zero net current sum or a net current sum periodically sustaining at or near zero each have cycle (flat spots) may be interpreted as a "no-fault" condition or an "external fault" condition, respectively, both of which being no trip conditions. On the other hand, a net sum current resulting from an "internal fault" takes upon a sine wave shape for the most part with no sustained "flat spots" in the waveform. Thus, analyzing the net current sum or differential signal waveform for sustained "flat spots" becomes an important part of the fault detection scheme.

When the net current sum signal increases in amplitude to the point which indicates an apparent fault condition a trip signal timer is activated for a predetermined time interval and if at least one sustained "flat spot" is not detected by the end of such time interval, a trip signal is issued. The trip signal delay time interval may be adjusted to an interval on the order of 10 to 12 milliseconds from the detection of the apparent fault inception, for example. A circuit schematic of a bus differential relay suitable for embodying the aforementioned functions is shown in FIG. 4.

Figure 4:
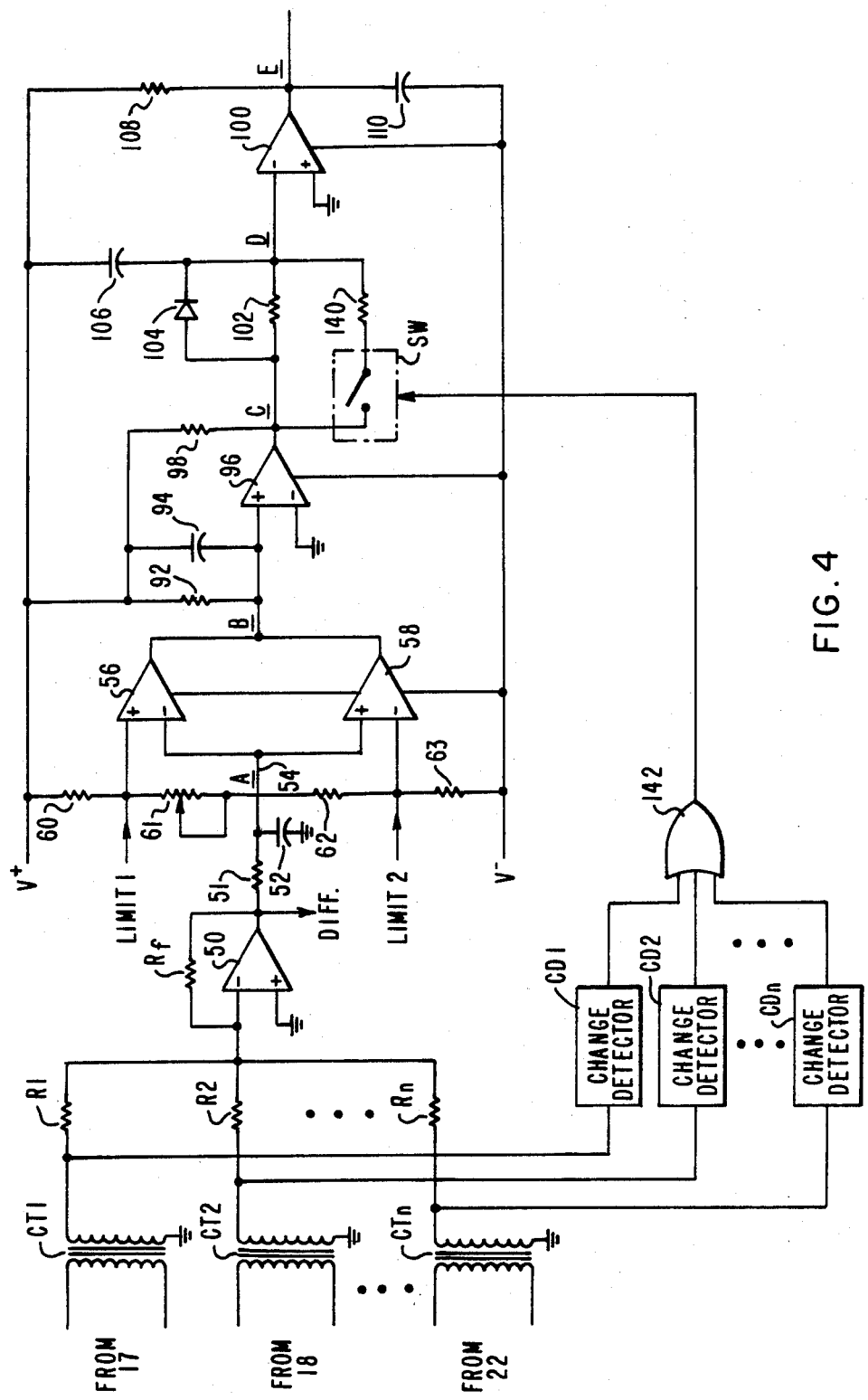
FIG. 4 is a circuit schematic of a bus differential relay suitable for embodying the principles of the present invention.

Referring to FIG. 4, auxiliary conventional current transformers CT1, CT2, ... CTn may be used to couple the generated current signal from the feeder line current transformers like 17 through 22, for example, associated with the protected bus section 10. The corresponding current signals are summed using a conventional summing amplifier arrangement having resistors R1, R2, ... Rn commonly coupled to the inverting (−) input of an operational amplifier 50 from their corresponding current transformers CT1, CT2, ... CTn, respectively. The operational amplifier 50 has its non-inverting (+) input coupled to the relay's common potential. A net current sum signal or differential signal DIFF at the output of the operational amplifier 50 via the feedback resistor Rf coupled across the (−) input and output thereof.

The DIFF signal may be filtered slightly by an RC filter arrangement including resistor 51 and capacitor 52 coupled in series between the output of amplifier 50 and the relay's common potential filtered DIFF signal 54 taken from capacitor 52 is supplied to a window comparator circuit arrangement including comparators 56 and 58 which may have open collector output stages similar to the comparators having Model No. LM339, for example. The DIFF signal 54 may be coupled to the (−) input of 56 and the (+) input of 58. The emitters of the output stages of 56 and 58 maybe commonly tied to a negative potential V−.

Two reference amplitude levels denoted as LIMIT1 and LIMIT2 may be generated using the series resistor network of resistors 60, 61, 62 and 63 coupled between a positive voltage supply V+ and the negative voltage supply V−. LIMIT1 is generated at the junction between the resistors 60 and 61 which point is coupled to the (+) input of the comparator 56. Similarly, LIMIT2 is generated at the junction between the resistors 62 and 63 which point is coupled to the (−) input of the comparator 58. Resistor 61 may be a variable resistor to allow slight adjustment of the reference amplitude levels.

The foregoing described window comparator circuit including the generation of the two reference amplitude levels presumes the generated DIFF signal has a zero or near zero average, i.e. little or no DC offset. In practice this may not always be the case. If DC offsets are present in the DIFF signal, the DIFF signal may continuously exceed one or the other of the reference amplitude levels which define the amplitude window of a "flat spot". Apparently, some dynamic adjustment of the amplitude window reference levels is desirable to avoid the aforementioned situation. Two circuits suitable for changing dynamically the reference window amplitude levels as a function of the DIFF signal are shown in FIGS. 5 and 6.

Referring to FIG. 5, the DIFF signal is coupled to a conventional averaging circuit 66 which generates a signal at the output 68 thereof representative of the average of the DIFF signal. More specifically, the DIFF signal is coupled to the (−) input of an operational amplifier 70 through a resistor 72. Coupled across the amplifier between the (−) input and the output 68 is a parallel network of a resistor 74 and capacitor 76. The (+) input of the amplifier 70 may be coupled to the relay's common potential. In addition, the output 68 may be coupled to an inverting amplifier circuit 80 comprising an operational amplifier 82 which has its (−) input coupled to output 68 through a resistor 84 and its (+) input coupled to the relay's common potential. A feedback resistor 86 is coupled between the (−) input of amplifier 82 and its output 88. In this embodiment, resistors 90 and 91, coupled commonly to the output 88, convert the voltage signal at 88 into separate current signals of the same polarity which are supplied to the resistor network 60-63 at the points LIMIT1 and LIMIT2, respectively.

In operation then, the circuit 66 generates a signal of the average or DC offset of the DIFF signal at 68 which is inverted by the circuit 80 and converted to a separate current signals through the resistors 90 and 91. The separate current signals are supplied to the resistor network 60-63 via 90 and 91 for altering the reference amplitude levels LIMIT1 and LIMIT2, respectively, in the same direction. The circuit accomplishes this by adding to each point LIMIT1 and LIMIT2 a separate common polarity current signal which is proportional to the output signal at point 88. Accordingly, if the DC offset is positive the entire reference amplitude window is shifted in a positive amplitude direction with respect to the relay's common potential and similarly, if the DC offset is negative the process operates in reverse.

The alternate embodiment as shown in FIG. 6 includes a similar circuit arrangement like that described in connection with the embodiment depicted in FIG. 5, except that the resistor 91 is coupled from the output 68 to the resistor network 60-63 at the point LIMIT2. In operation, the embodiment of FIG. 6 alters the reference amplitude levels LIMIT1 and LIMIT2 dynamically in opposite directions by adding to one level a positive polarity current signal and to the other a negative polarity current signal, both positive and negative current signals being proportional to the average of the DIFF signal.

Referring back to FIG. 4, the output of the window comparator circuit, that is, the common coupling of the outputs of the comparators 56 and 58, is coupled to the positive voltage supply V+ through a parallel combination of a resistor 92 and a capacitor 94 and is also coupled to the (+) input of another comparator 96 which may also be an open-collector output shape type like the LM339. The output of the comparator 96 may be coupled to the V+ supply through a resistor 98 with the emitter of its output stage coupled to the V− supply. The (−) input of comparator 96 may be referenced to the relay's common potential. In operation, the capacitor 94 discharges rapidly to approximately the V− supply when the output stage of the window comparator 56/58 is closed circuited and charges through the resistor 92 when the output stage is open circuited. When the voltage level of the (+) input to the comparator 96 is substantially at the V− supply, its output is also approximately at the V− supply, but when the output stage of the window comparator 56/58 is open circuited, the output of the comparator 96 remains at the V− level until the voltage at the (+) input of the comparator 96 reaches the relay's common potential. Thereafter, the output of the compartor 96 is transferred to approximately the V+ level. In this manner, the comparator 96 and resistor capacitor combination 92 and 94, respectively, offer a time delay for the voltage level transition from V− to V+ of the window comparator's output stage.

Next in the relay circuit of FIG. 4, the output of the compartor 96 is coupled to the (−) input of another comparator 100 through a resistor 102 which is paralleled by a diode 104 which has its cathode coupled to the (−) input of the comparator 100. A capacitor 106 is connected between the V+ supply and the (−) input to the comparator 100. The (+) input of the comparator 100 may be coupled to the relay's common potential. The comparator 100 may also be of the open-collector output stage type similar to the LM339 and have the collector of its output stage coupled to the V+ supply through a resistor 108 with the emitter thereof coupled to the V− supply. In addition, a capacitor 110 may be coupled from the collector of the output stage to the V− supply.

In operation, when the output of the comparator 96 is conducting, the capacitor 106 is discharged through the resistor 102. The time delay of resistor 102 and capacitor 106 may be set such to effect a voltage level decay at the (−) input of the comparator 100 to the relay's common potential which will last for on the order of 10 to 12 milliseconds. Conversely, when the output stage of the comparator 96 is open circuited, the capacitor 106 charges more rapidly via the resistor 98 and diode 104. Of course, when the voltage level of the (−) input to the comparator 100 drops below the relay's common potential, its output stage conducts and vice versa.

Examples of operation of the relay embodiment described in connection with FIG. 4 will next be described using the waveforms of FIGS. 7 and 8. The time waveforms A-E of FIGS. 7 and 8 represent the voltage potentials at the same letter referenced points in the relay circuit shown in FIG. 4. The set of waveforms A-E of FIG. 7 represent the operation of the relay circuit in response to an internal fault. The waveform A is representative of the DIFF signal at the input of the window comparator 56/58. Assume that at time $t_0$, an internal fault commences. As the waveform A extends beyond the reference amplitude window set by the amplitude levels LIMIT1 and LIMIT2 at $t_1$, the output of the window comparator 56/58 and the comparator 96 start conducting as shown by waveforms B and C which causes the capacitor 106 to start discharging as shown by the waveform D. As the waveform A falls back within the reference amplitude window at $t_2$, the output stage of the window comparator 56/58 stops conducting permitting the capacitor 94 to begin charging as shown in the waveform B. However, before the voltage level at the (+) input to the comparator 96 reaches the relay's common potential, the DIFF signal at $t_3$ again exceeds the boundaries of the reference amplitude window causing the output stage of the window comparator 56/58 to again conduct which discharges the capacitor 94. Thus, since the voltage level at the (+) input of the comparator 96 never reaches the comparator's reference level which is set at the relay's common potential for the preferred embodiment, the output of comparator 96 remains conducting. This same operational sequence will occur at the crossover points $t_4$, $t_5$ and $t_6$ and so on. Since the output stage of comparator 96 (point C) remains conducting, the capacitor 106 continues to discharge as shown by the waveform D in which case after about 10 or 12 milliseconds it reaches the reference level of the comparator 100 which is also set at the relay's common potential for the preferred embodiment. When this occurs, the output of the comparator 100, point E, is caused to transfer to the trip signal state as shown by the waveform E.

The waveforms of FIG. 8 represent the operation of the relay's circuit in response to an external fault in a feeder line with the faulted feeder line current transformer being saturated during portions of the alternating current cycle as exemplified in the waveform X. Referring to FIG. 8, assume again that the external fault commences at the time $t_0$. Note that during the period of time that the current transformer of the faulted feeder line is unsaturated the DIFF signal remains at or near zero. It is only when the current transformer saturates such as that shown commencing at $t_1$ which causes the DIFF signal to exceed the boundaries of the reference amplitude window causing the comparator outputs at B and C to conduct. These operations are shown in the waveforms A, B and C of FIG. 8. In addition, when point C is transferred to approximately a V− level at $t_1$, capacitor 106 begins discharging through the resistor 102 which operation is exemplified by the waveform D. As the current transformer comes out of saturation at $t_2$, the DIFF signal returns to its zero or near zero state and is sustained thereat for a sufficient time to permit the capacitor 94 to charge and bring the voltage level at the (+) input to the comparator 96 to a level greater than its reference level and cause its output to stop conducting at time $t_3$. The foregoing operations are depicted in the waveforms A, B and C of FIG. 8. When the output of the comparator 96 stops conducting, the capacitor 106 is charged quickly via resistor 98 and diode 104 causing point D to rise back to approximately the V+ supply level. Thus, the voltage level at point D is not permitted to discharge below the reference level of the comparator 100 and cause a trip signal to occur at point E. Similar operations occur at subsequent saturation points at time intervals $t_4$, $t_5$ and $t_6$ of FIG. 8. In this manner, the relay inhibits the trip signal from occurring in response to an external fault by analyzing the flat spots of the DIFF signal corresponding to the times when the faulted feeder line current transformer is not saturated.

The foregoing described relay circuit yields a trip response time in the neighborhood of 10 to 12 milliseconds which is quite adequate for most applications. However, in some applications there is a desire to have a trip delay time of five milliseconds or less. One method of accomplishing a shorter trip delay time is to detect the exact moment of the fault current from the feeder line signals and evaluate the net current summation signal in the two or so milliseconds following fault inception since experience has shown that current transformers normally do not saturate within the first three or four milliseconds following fault inception. This aspect of applicants' invention is shown in the embodiment of FIG. 4 with a plurality of change detectors CD1, CD2, . . . ,CDn coupled respectively to corresonding current transformers CT1, CT2, . . . ,CTn to detect the moment of fault inception for any of the feeder line currents.

A block diagram schematic of a suitable change detector is shown in FIG. 9. Referring to FIG. 9, the current transformer signal is coupled to both a differentiator 120 and an integrator 122. The differentiated signal 121 is divided by a signal ω representative of the angular frequency of the current signal in a conventional divider circuit 124. In addition, the integrated signal 126 is multiplied by the signal ω in a conventional multiplier 128. The quotient signal and product signal resulting from the operations of the divider 124 and multiplier 128 are summed in a conventional summer 130 and the resultant signal therefrom is supplied to one input of an AND gate 132. The output of the AND gate 132 is supplied to both an approximately two millisecond one shot circuit 134 and an approximately 100 millisecond one shot circuit 136. The output of the one shot 134 becomes the output of the change detector circuit and the output of the one shot 136 is fed back to an inverting input of AND gate 132 for inhibiting the operation thereof.

The foregoing described change detector circuit works on the principle that a current signal with no fault appears substantially as a sine wave and a departure from this sine wave occurs briefly at the inception of a fault. In operation, the differentiator 120 shifts the sine wave by 90° leading and the integrator 122 shifts it 90° lagging. Thus the resulting product signal and quotient signal through the units 128 and 124, respectively, are normally 180° apart using a proper scaling factor. Accordingly the summation at 130 will result in a substantially zero level signal to the AND gate 132 under no fault conditions. With the inception of a fault the input current signal departs from a sine wave which causes a non-zero result at the output of the summer 130 and input to the AND gate 132 which is triggered as a consequence thereof. In response, the one shot 134 produces an approximate two millisecond pulse at its output and the one shot 136 produces an approximate 100 millisecond pulse at its output which inhibits further operation of the AND gate 132 for the duration of the 100 millisecond pulse. In this manner, a pulse for a duration of two milliseconds or so may be produced at the moment of fault inception as detected by the change detector.

Referring back to FIG. 4, the series combination of a resistor 140 and an electronic switch SW is connected in parallel across the resistor 102 between points C and D. The resistor 140 is set at a value to discharge the capacity 106 from its charged V+ supply level value to the reference value of the comparator 100 in about two milliseconds or so. The change detectors CD1-CDn are coupled to inputs of an OR gate 142 which is used to activate the electronic switch SW in the closed position. Thus, a pulse from any of the change detectors CD1-CDn indicative of the inception of a fault may close the electronic switch causing the resistor 140 to be paralleled with the resistor 102 which results in a shortened trip delay time. The electronic switch SW may only be closed for the two millisecond or so pulse width and if the capacitor 106 is not discharged within that time period, the switch SW is reopened and the relay circuit is returned to its original state. Accordingly, for any fault, trip evaluation is permitted for a two millisecond window immediately following fault inception, but thereafter the circuit reverts back to the original scheme for timing of the total fault duration.

While various aspects of the present invention have been described in connection with the embodiments of FIGS. 4, 5, 6 and 9, it is understood that additions and modifications may be made to such embodiments without deviating from the inventive principles. Accordingly, the present invention should not be limited to any one embodiment, but rather construed in breadth and scope according to the recitation of the appended claims.

What is claimed is:

1. In a power system network including a bus section and a plurality of feeder lines coupled thereto for conducting alternating current through said bus section, each feeder line including a current transformer for measuring the alternating current therethrough and generating a signal representative thereof in both amplitude and periodicity, each current transformer having a limited current amplitude measurement capacity beyond which saturation thereof occurs resulting in the loss of its generated feeder line current signal during saturation, a bus differential relay governed by said generated current signals of said plurality of feeder lines to protect said bus section from an internal fault by interrupting current through said plurality of feeder lines and to safeguard against current interruption from a false indication of an internal fault caused by an external fault on at least one of the feeder lines of said plurality with the corresonding current transformer being saturated during a portion of the periods of said alternating current, said bus differential relay comprising:

first circuit means for summing instantaneously the generated current signals corresponding to the feeder lines coupled to said bus section and for generating a current differential signal representative of said instantaneous current signal sum;

second circuit means for generating two reference amplitude levels which form an amplitude window;

third circuit means for generating a first indication upon the occurrence of the amplitude of said current differential signal extending outside said formed amplitude window and for generating a second indication upon the occurrence of the amplitude of said current differential signal falling within said formed amplitude window;

first timing circuit set by a first indication generation to commence timing over a first time period and, after timing through said first time period, to generate a trip signal to render current interruption through said plurality of feeder lines; and second timing circuit set by a second indication generation to commence timing over a second time period and, after timing through said second time period, to generate a reset signal, said second timing circuit being resettable during said second timing period by a first indication generation to prevent the generation of said reset signal, said first timing circuit being resettable during said first timing period by a reset signal generation to prevent the generation of said trip signal, said first timing period being longer than said second timing period.

2. The bus differential relay in accordance with claim 1 wherein the second circuit means includes means for generating the two amplitude levels, one above and one below a zero amplitude level.

3. The bus differential relay in accordance with claim 1 including fourth circuit means for altering the two amplitude levels generated by the second circuit means, said fourth circuit means includes:

an averaging circuit for generating a signal representative of the average of the current differential signal; and another circuit for altering the two amplitude levels in the same direction by adding to each a common polarity signal which is commensurate with said average signal.

4. The bus differential relay in accordance with claim 1 including fourth circuit means for altering the two amplitude levels generated by the second circuit means, said fourth circuit means includes:

an average circuit for generating a signal representative of the average of the current differential signal; and another circuit for altering the two amplitude levels in opposite directions by adding to one level a positive polarity signal and to the other level a negative polarity signal, both of the positive and negative polarity signals being proportional to said average signal.

5. The bus differential relay in accordance with claim 1 including: a change detector circuit coupled to each current transformer for detecting a potential fault inception from the current signals generated thereby and for generating a signal pulse upon such detection; and fifth circuit means governed by said signal pulse to shorten the first timing period of the first timing circuit for the duration of said signal pulse, whereby a trip signal may be generated by the first timing circuit after timing through the shortened timing period.

6. The bus differential relay in accordance with claim 1 wherein the third circuit means includes a window comparator operative to generate a signal between first and second states in response to the amplitude of the current differential signal, the first indication being a transition from said first state to said second state and the second indication being a transition from said second state to said first state; wherein the second timing circuit includes a second comparator circuit and a parallel resistor-capacitor network coupled commonly to second comparator circuit and the third circuit means; and wherein the first timing circuit includes a third comparator circuit and a second resistor-capacitor network with a diode coupled in parallel across said resistor, said second resistor-capacitor network being coupled between the second timing circuit and said third comparator circuit.

7. The bus differential relay in accordance with claim 6 including:

a change detector circuit coupled to each current transformer for generating a signal pulse upon detecting a potential fault inception from the current signals generated by the current transformers; and a series combination of an electronic switch and another resistor coupled in parallel across the resistor of the second resistor-capacitor network, said another resistor being of lower resistance than said resistor it is paralleling, said electronic switch governed by said signal pulse to conduct for the duration of said pulse.

* * * * *